United States Patent

Dalton

[15] 3,642,312
[45] Feb. 15, 1972

[54] SMEAR CLADDING FOR SEALING AND CORROSION CONTROL IN PURE-ALUMINUM-COATED ALUMINUM ALLOY SHEETS

[72] Inventor: A. Stanley Dalton, Bellbrook, Ohio

[73] Assignee: The United States of America as represented by the Secretary of the Air Force

[22] Filed: Dec. 4, 1969

[21] Appl. No.: 882,181

Related U.S. Application Data

[63] Continuation-in-part of Ser. No. 689,871, Dec. 12, 1967, abandoned.

[52] U.S. Cl............................................287/189.36, 85/37
[51] Int. Cl..............................................................F16b 5/04
[58] Field of Search................85/37; 287/189.36, 189.36 C; 29/458, 432, 505

[56] References Cited

UNITED STATES PATENTS

| | | |
|---|---|---|
| 771,236 | 10/1904 | Farley........................................85/37 |
| 2,410,398 | 10/1946 | Williams....................................85/37 |
| 2,243,979 | 6/1941 | Reynolds...................................29/458 |

FOREIGN PATENTS OR APPLICATIONS

| | | |
|---|---|---|
| 686,312 | 1/1953 | Great Britain............................85/37 |
| 8,369 | 5/1913 | Great Britain...........................29/505 |

*Primary Examiner*—Edward C. Allen
*Attorney*—Harry A. Herbert, Jr. and Charles H. Wagner

[57] ABSTRACT

Means for smear cladding exposed end-grain high-strength aluminum alloy in fastener-receiving openings through pure-aluminum-coated high-strength aluminum alloy sheets by pure-aluminum-coated hard core metallic fasteners having a maximum diameter at least as great, or slightly greater, than the diameter of the openings, and forcing the fasteners through the openings to wipe off a material layer of the pure aluminum from the fastener onto the walls of the openings from end-to-end thereof, and secure the sheet together and to provide pure aluminum continuity from end-to-end through said openings between the pure-aluminum-coated opposite side of the sheets.

1 Claim, 5 Drawing Figures

PATENTED FEB 15 1972  3,642,312

INVENTOR.
A. S. DALTON
BY Harry A. Herbert Jr.
and
Charles B. Wagner
ATTORNEYS

SMEAR CLADDING FOR SEALING AND CORROSION CONTROL IN PURE-ALUMINUM-COATED ALUMINUM ALLOY SHEETS

This invention is a continuation-in-part of my copending patent application, Ser. No. 689,871, for "Smear Cladding for Sealing and Corrosion Control," filed Dec. 12, 1967 and now abandoned.

BACKGROUND OF THE INVENTION

The invention solves laborious, messy, and costly problems of formally applying wet sealants or primers to hidden surfaces, particularly during aircraft production, maintenance, and modification programs now required for corrosion control programs.

One of the most troublesome and severe corrosion programs confronting the aircraft industry today is the exfoliation of aircraft structural skin material, especially high-strength aluminum alloy aluminum-coated sheets, starting at the fastener-receiving holes.

Metal cladding or painting of the exterior surfaces of the aircraft does not eliminate this difficulty. When the holes for the fasteners are drilled or punched in the structural members or plates, to receive the fasteners, the cladding no longer provides the desired protection for the end-grain of the high-strength base metal alloy which is then exposed in the walls of the fastener-receiving holes. Moisture seeps or is drawn into the fayed surfaces or between the fasteners and the walls of the holes and countersunk openings where the end-grain of the structural material or sheets was exposed by the drilling (or punching), for the reception of the fasteners.

With paint coatings, when applied to the skin surfaces, moisture penetration may be retarded or postponed to some degree but once the coating becomes aged it begins to crack or flake around the fastener heads. This allows the moisture direct access to the critical end grain areas in the walls of the holes around the fasteners. In either case, although painting has been previously recommended, since it afforded some degree of temporary protection, moisture was found to eventually penetrate, and corrosion and exfoliation occurred.

Also fastener installation with a wet zinc chromate primer, or uncured fuel tank sealant has been used but this did not produce the desired results, particularly, it does not solve the problems of nonelectrical continuity and temperature variations.

SUMMARY OF THE INVENTION

This invention solves the above difficulties and objections by introducing the concept of mechanically smear cladding the exposed end-grain of aluminum-coated high-strength aluminum structural alloys in the walls of fastener-receiving hole areas by the positive action and force of fastener application techniques. For example a deposited coating of high-purity aluminum will not only act as an inhibitive barrier for the interior of the fastener itself, but in addition provides an effective and satisfactory metallic sealant between the fasteners and the exposed end-grain surfaces of walls of the hole and countersink area for the fastener but also, since the aluminum is a soft and ductile metal, especially when pure, the action of forcing the fasteners into the holes will cause the relatively thick coatings of soft and pure aluminum coatings on the fasteners to wipe or smear off from the fasteners onto the exposed end-grain areas in the walls of the fastener-receiving openings in the high-strength aluminum alloy metal being fastened or secured, to provide a relatively thick smear cladding on the inner walls of the openings from end to end, effectively sealing the exposed end-grain of the alloy in the openings from end to end thereof.

Another important object and advantage accomplished by the invention and concept is that of not only satisfactorily controlling corrosion and exfoliation of the structural skin material around the fasteners, such as rivets, bolts or the like but it also provides the ability to obtain a complete electrical continuity control in the structure between the outer aluminum surfaces thereof.

Another important object of the invention is the application of a relatively thick, soft, pure aluminum coating on the fasteners, which is sufficiently thick to wipe off and smear coat and clad the exposed end-grain of the metal in the walls of the fastener-receiving openings surrounding the fastener by the fastener insertion and securing action and being of sufficient thickness to fill any small exposed end-grain "voids" in the fastener-receiving holes when the fasteners are forced into the holes and drawn up tight.

A further object is the application of a relatively thick coating of pure aluminum on the outer surfaces of fastener members to provide fasteners having a diameter at least equal to the hole diameters and adapted to be forced in holes made in high-strength aluminum alloy sheets and smear coat the end-grain of the exposed alloy metal in the walls of the holes, whereby during the insertion and tightening of the fastener members in the holes the pure aluminum is wiped off onto the exposed end-grain alloy surfaces and to fill any pores or small voids that were present in the walls of the holes, to provide a solid metallic homogenous, substantially permanent electrical continuity between and through the deposited smear coating or cladding on the walls between the outer surfaces of the alloy sheets, when the fasteners are forced into and tightly secured in the holes.

Other objects and advantages of the invention will become apparent from the following description and accompanying drawings in which like reference characters refer to like parts.

BRIEF DESCRIPTION OF THE PREFERRED EMBODIMENT

This invention introduces the concept of mechanically smear cladding the exposed end-grain in the walls of fastener-receiving holes in pure-aluminum-coated plates such as pure-aluminum-coated aluminum alloy sheets, by forcing fasteners of at least the size of the holes into securing position in the holes. A smear coating of high-purity aluminum disposed on the exposed end-grain in the wall of a fastener-receiving opening in a high-strength alloy sheet, wiped off of the fastener, not only acts as a corrosive inhibitive barrier but in addition as a permanent soft pure aluminum "sealant" between the fastener and the inner surface of the hole and the countersink area for the fastener head but also, since the pure aluminum smear coating is a soft and ductile metal, especially when pure, it permits the forced mechanical insertion action and drawing up the fastener which is at least as large or slightly larger than the hole and has a coating of pure aluminum of an appreciable thickness, not less than one-half mil, causes this coating to impinge and wipe off onto the exposed end grain of the base aluminum alloy from end to end of the opening and form a pure aluminum smear coating on the walls of the opening between the outer aluminum surfaces of the sheets of sufficient thickness to satisfactorily seal the exposed end grain of the base alloy in the fastener-receiving holes against moisture, and also fill and seal any space between the base alloy and fastener throughout the length thereof, and in addition, provide electrical continuity in and through the structural members which are secured together by the fasteners, between the exterior surface coatings, and prevents or arrests the exfoliation of the structural skin material which starts at the fastener holes.

This is particularly true when the structural members or plates, which are secured by the fasteners, are made of high-strength aluminum alloys with surface coatings of substantially the same pure aluminum as the relatively thick pure aluminum coatings on the fasteners.

Figure 1:
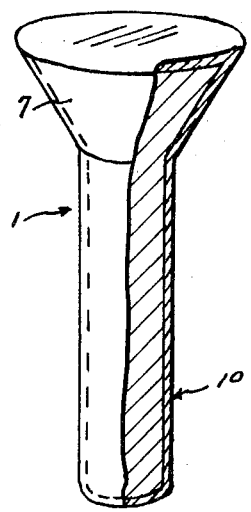
FIG. 1 is a somewhat schematic perspective view of a fastener member, such as a countersunk head rivet with a portion of the soft fairly thick metallic pure aluminum coating broken away.
Figure 2:
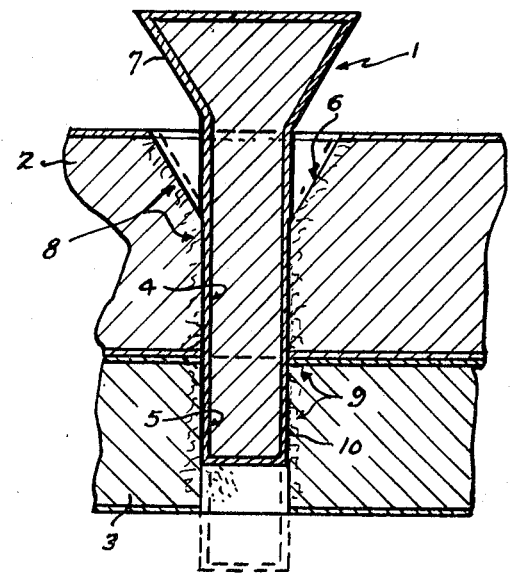
FIG. 2 is a similar schematic longitudinal sectional view illustrating one of the soft pure-aluminum-coated fastener members forced partly through a slightly smaller prepared hole in two aluminum-coated structural aluminum alloy sheets or plates.
Figure 4:
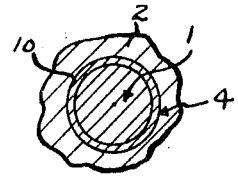
FIG. 4 is a transverse sectional view taken about on line 4—4 in FIG. 3.
Figure 3:
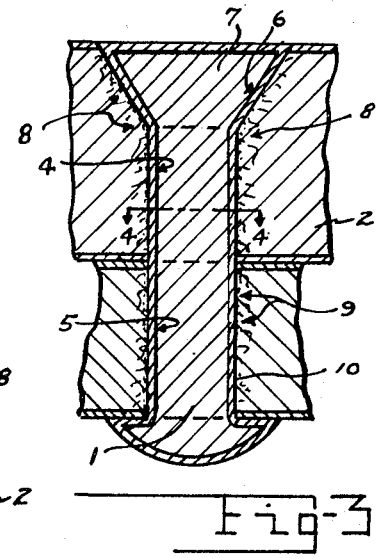
FIG. 3 is a longitudinal sectional view similar to that shown in FIG. 2, but with one of the pure-aluminum-coated fastener members forced down to its final securing position in the pure-aluminum-coated aluminum alloy plates, or sheets, or structural members, for securing the same together.
Figure 5:
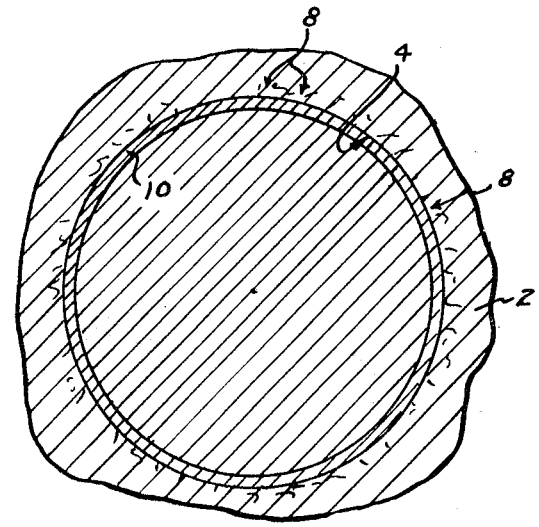
FIG. 5 is a greatly enlarged sectional view, similar to FIG. 4, schematically illustrating the soft pure aluminum smear coating on the fastener in sealing and cladding contact with the exposed end-grain alloy in the wall of the fastener-receiving hole, more particularly showing how the coating smears or is wiped off of the fastener and onto the wall of the hole to smear coat the wall from end to end, to form an aluminum cladding which fills any small voids in the wall that might have been caused by the drilling or punching of the fastener-receiving hole, when the coated fastener is forced through the holes and tightened into its final securing position.

Referring more particularly to FIG. 1, the reference numeral 1 denotes one type of pure-aluminum-coated fastener member generally, such as a conventional type countersunk head rivet having a diameter equal or slightly greater than the fastener receiving opening for securing or riveting together two pure-aluminum-coated high-strength aluminum alloy structural members, such as pure-aluminum-coated aluminum high-strength alloy sheets or plates, indicated generally at 2 and 3. Aligned fastener-receiving openings or holes in or through the plates or structural members are indicated at 4 and 5 respectively.

The upper plate or sheet 2 as shown is drilled or punched and countersunk as indicated at 6 to tightly accommodate the shank and countersunk head 7 of the pure-aluminum-coated fastener therein when the fastener 1 is forced into and through the drilled or punched fastener-receiving openings or holes 4 and 5.

The drilling or punching operation of the coated aluminum alloy sheets or plates, of course, exposes the end-grain structure of the base high-strength aluminum alloy to the interior of the holes or bores 4 and 5 and in the countersunk head receiving portion 6. The fasteners being the same or larger diameter than the openings are forced into and through these drilled or punched fastener receiving openings 4 and 5 and into the countersunk area portions 6. The end-grain alloy structure or portion in the bores 4 and 5, and in the countersunk area portion 6, are indicated at 8 and 9 respectively.

It has been found that these end-grain portions 8 and 9 in the rivet or fastener-receiving holes 4 and 5 are normally very difficult to permanently seal and provide pure aluminum continuity between the outer pure aluminum coatings, and exfoliation of the surface of the exposed end grain structural material between the surface coatings becomes a serious problem.

It starts at the rivet holes and spreads. Metal cladding or painting of the exterior surface of an aircraft does not prevent this difficulty since when the holes, such as 4 and 5, are drilled and countersunk (such as at 6) the pure aluminum surface cladding or painting is punctured and no longer provides the desired protection for the end-grain 8 and 9 of the base aluminum alloy, then exposed to the interior of the holes for the fasteners and moisture seeps in, or is drawn into the fayed surfaces between the fasteners 1 and the walls of the holes or bores 4 and 5 and the countersunk area 6. Paint coatings applied to the skin initially retarded moisture penetration to some extent but aging (and vibration) cause these coatings to crack around the fastener heads 7 and moisture eventually penetrates and corrosion and flaking starts.

Certain primers, such as wet zinc chromate or uncured tank sealant, when applied to the fastener openings and the rivets or fasteners, did not produce the desired result, and further did not solve the problem of "electrical discontinuity" and high-temperature variations.

Applicant, by depositing a fairly thick coating of high-purity soft aluminum, indicated at 10, on the outer surface of the fasteners to force fit the receiving holes. This smear coats or cladds the exposed end-grain structure 8 in the walls of the fastener-receiving holes or bore area 4, 5 and 6 by the forced fastener application techniques was found to satisfactorily solve this problem.

The deposited surrounding coating of the soft, high-purity aluminum on the fasteners or rivets not only acts as a corrosion inhibitive barrier for the core of the fastener itself, but in addition, being scraped off of the fasteners and onto the walls by forcing into the holes provides a pure aluminum substantially permanent sealant between the fasteners and the exposed end-grain surfaces of the high-strength alloy in the holes 4 and 5 and countersunk areas 6, but also, since the pure aluminum contemplated throughout this disclosure as illustrated is a relatively soft metal and not subject to corrosion, especially when pure, the mechanical action of forcing the fasteners into the holes and drawing up the fastener will cause the soft coating 10 to wipe off onto the exposed end-grain areas 8 and 9, of the aluminum alloy sheets 2 and 3 between the pure aluminum coatings, to provide a protective smear cladding and effective seal, as well as providing a satisfactory solution to the objectional problem of electrical discontinuity and high-temperature variations between the structural base material, such as the sheets or plates 2 and 3 and the fasteners 1.

Fasteners coated with soft, relatively thick pure aluminum and having a diameter as large or slightly larger than their receiving holes, can be used on all production aircraft and missiles, and in all rework operations. This concept will also apply to coating of faying surfaces in the attachment of parts, if sufficient force and motion is present in the attaching operation to compress and smear the coating onto or into the exposed end-grain in the walls of the fastener receiving openings or bores. Since these openings expose the end-grain of the high-strength structural aluminum alloys, any small "voids" that may occur in the walls of the openings, caused by the drilling or punching operations, are completely filled with the softer aluminum cladding material coated on the outside surface of the fasteners.

Some of the available methods for applying the pure soft aluminum coating to the exterior of the fasteners are mechanical cladding, such as jacketing and peening, flame spraying, vacuum deposition, molten dipping, electroplating, and vapor or gas plating. All methods may be of value so long as a relatively thick and soft coating of pure aluminum, greater than one-half mil in thickness, is applied so that the fastener insertion application techniques will move or smear some of the coating from the exterior of the fastener onto and into the exposed end-grain of the base aluminum alloy material in the receiving openings surrounding and in contact with the fasteners, as they are forced and secured in position in the structural sheet members.

For the purpose of this application, pure aluminum is intended to be high-purity aluminum with no strengthening alloy materials added.

For purposes of exemplification a particular embodiment of the invention has been shown and described to the best understanding thereof. However, it will be apparent that changes and modifications in the arrangement and construction of the parts may be resorted to without departing from the true spirit and scope of the invention as defined in the following claims.

What is claimed is:

1. In combination with a plurality of high-strength aluminum alloy sheets having a plurality of aligned rivet receiving apertures, means securing the aluminum alloy sheets firmly together to prevent corrosion along the walls of the apertures, comprising: headed rivets, having a hard metal core completely covered with at least a one-half mil coating of soft pure aluminum, with the original overall diameter of the rivets and coating being greater than the diameter of the apertures in the aluminum alloy sheets; said rivets forced into the apertures and forming smear clad coatings of pure aluminum on the walls of the apertures to seal the end-grain and any space between the aluminum alloy sheets and the rivets.

* * * * *